US009893504B2

(12) United States Patent
Huang (10) Patent No.: US 9,893,504 B2
(45) Date of Patent: Feb. 13, 2018

(54) OUTLET COVER ASSEMBLY (71) Applicant: Junjie Huang, Fuzhou (CN)

(72) Inventor: Junjie Huang, Fuzhou (CN)

( * ) Notice: Subject to any disclaimer, the term of this patent is extended or adjusted under 35 U.S.C. 154(b) by 362 days.

(21) Appl. No.: 14/568,036

(22) Filed: Dec. 11, 2014

(65) Prior Publication Data

US 2016/0172830 A1  Jun. 16, 2016

(51) Int. Cl.
*H02G 3/14* (2006.01)

(52) U.S. Cl.
CPC ..................... *H02G 3/14* (2013.01)

(58) Field of Classification Search
USPC ............................................ 174/66; 220/242
See application file for complete search history.

(56) References Cited

U.S. PATENT DOCUMENTS

| 2,980,283 A | * | 4/1961 | Bentsen | H02G 3/14 |
| | | | | 220/241 |
| 4,593,541 A | * | 6/1986 | Hollis | E05B 73/00 |
| | | | | 174/67 |
| 8,251,253 B1 | * | 8/2012 | Cleghorn | H01H 9/02 |
| | | | | 174/50 |

* cited by examiner

*Primary Examiner* — Dhirubhai R Patel
(74) *Attorney, Agent, or Firm* — Louis J. Alfieri (57) ABSTRACT

A method and apparatus for assembling and installing an outlet cover for an electrical outlet box. The apparatus includes a base having a rectangular mounting aperture for aperture adapter assemblies. To create the desired cover plate, the appropriate aperture adapters has to be selected and assembled to accommodate the desired standard electrical outlet such as a light switch or socket. A cover is hinged to the base by fitting hinge members on both parts together and thus enables the cover to swing forwardly and backwardly against the base. A planar lever and serrated bar is present on one side wall of the base, which is orthogonal with respect to the hinge axis. By retaining the planar lever at different serration on the serrated bar, the planar lever can hold cover at different height and thus adjusts cover plate assembly openings to accommodate various cord sizes.

5 Claims, 5 Drawing Sheets

OUTLET COVER ASSEMBLY

CROSS REFERENCE TO RELATED APPLICATIONS

This application claims priority to U.S. provisional application Ser. No. 61/914,550, filed Dec. 11, 2013, the entire contents of which is incorporated herein by reference. U.S. patent application Ser. No. 12/189,363, filed Aug. 11, 2008 and U.S. patent application Ser. No. 12/256,833, filed Oct. 23, 2008 are also incorporated herein by reference in their entireties.

BACKGROUND OF THE INVENTION

1. Technical Field

The invention disclosed herein relates to electrical outlet covers.

2. Related Art

Electrical devices used in conjunction with electrical device boxes vary and include electrical outlets (both standard and ground fault current interrupts), light switches (both toggle and rocker plates), rounds, and cable television and/or telephone ports. Conventional covers for electrical device boxes are designed to try and prevent inadvertent access to the electrical conductive elements of electrical devices and to hide associated wiring. Each type of electrical device requires different dimensioned access openings in a cover to accommodate it. However, conventional covers usually are non-convertible in their design, and therefore, each electrical device requires a different type of conventional cover configured for it. Thus, to install or service electrical devices, an electrician must carry several types of conventional covers to each site, which are time consuming and inefficient to install.

SUMMARY

According to one aspect of the disclosure, an electrical outlet cover assembly may be implemented with a base, the base further comprising a planar member wherein the planar member further comprises a substantially rectangular mounting aperture and at least one detachable adapter. The detachable adapter can be configured to form part of a first aperture by mounting the at least one detachable adapter to the rectangular mounting aperture on the base, and wherein the first aperture is substantially circular and configured to receive an electrical socket.

Such assembly can be further configured with a first aperture that is configured to function as a mounting space for receiving a second detachable adapter and wherein said second detachable adapter is configured to form a second aperture for receiving a second electrical socket of smaller diameter. The second aperture on the second detachable adapter can function again as a second mounting space by mounting a third adapter configured to fit the second aperture and wherein said third aperture is configured to receive a third electrical device such as a third electrical socket or toggle switch.

The third aperture can function as mounting space to receive a fourth or fifth, recursively, detachable adapter so as to form a fourth or fifth, recursively, aperture for receiving an electrical device of smaller area, and so on and so forth.

In another embodiment, the planar member on the base further comprises a substantially rectangular mounting aperture.

In the same vain, one or more additional detachable adapters can be included. Wherein the one or more additional detachable adapters are configured to form one or more additional apertures by mounting the one or more detachable adapters to the mounting aperture on the base.

The one or more additional apertures is configured to receive an electrical duplex socket or a ground-fault circuit interrupt (GFCI) socket. In fact, it is the purpose of the invention to be as inclusive as possible. As such, many other configurations are possible. For example, any one of the apertures disclosed herein, infra or supra, can be configured to fit any number of devices, electrical or not, and including By way of non-limiting example, at least one detachable adapter has two notches equally spaced around the first aperture and wherein the second detachable adapter and fifth detachable adapter both have two equally spaced tabs protruding circumferentially outward. The two equally spaced notches on the at least one detachable adapter are shaped to fit the two equally spaced protruding tabs on the second detachable adapter or on the fifth detachable adapter so as to orientate and secure the second detachable adapter to the at least one detachable adapter to form a second aperture or to orientate and secure the fifth detachable adapter to the at least one detachable adapter to form the fifth aperture.

The spirit of this invention contemplates, by way of non-limiting example, a second detachable adapter that can have two notches equally spaced around the second aperture, and even a third detachable adapter and the forth detachable adapter both can have two equally spaced tabs protruding circumferentially outward. The two equally spaced notches on the second detachable adapter are shaped to fit to the two equally spaced protruding tabs on the third detachable adapter or on the forth detachable adapter so as to orientate and secure the third detachable adapter to the second detachable adapter to form the third aperture or to orientate and secure the forth detachable adapter to the second detachable adapter to form the forth aperture.

In yet another implementation of the invention, any one or more of the at least one detachable adapters can have, for example, two or more equally spaced tongue-like clips around an aperture. The two equally spaced tongue-like clips can themselves be circumferentially and inwardly protruding so as to snap on to a device such as an electrical round socket, electrical toggle switch, or other electrical or non-electrical fitting as would be readily apparent to one of ordinary skill in the art.

In yet another embodiment of the invention disclosed herein, we have a base, the base further comprising a planar member, four sides and a hinge, and wherein the base comprises a single molded piece, a raised, serrated bar is present on one of the two sides of base that are orthogonal with respect to the hinge axis, a planar, swingable lever is embedded to the base by snapping or riveting one end of the planar, swingable lever to the same side as the serrated bar and configured to make the lever swingable around the snapped or riveted rotational axis, and wherein the snapped or riveted axis is parallel to the hinge axis. The connection mechanism can be, for example a snap configuration with a female snap member and a male snap member where the female snap member can have an inner groove to snap the male snap member in place.

Possibly at least two serrations are present on the serrated bar and the swingable lever slides along the serrated bar so that the swingable lever can stay at one or more positions along the serrated bar.

The swingable lever can swing around the snapped or riveted axis, and wherein the gap between a corresponding same side on the base and cover is configured to make the swingable lever substantially invisible while in use.

The end of the swingable lever opposite to the snapped or riveted end can be configured to mate with the corresponding area on the cover. The swingable lever can be configured so that while placed at the lowest serration on the serrated bar, the swingable lever engages with the cover at a fully closed position and a minimized cover plate assembly opening is formed.

Another embodiment can be implemented so that the end of the swingable lever opposite to the snapped or riveted end is configured to mate with the corresponding area on cover, and wherein the swingable lever is configured so that while retained at the highest serration on the serrated bar, the swingable lever engages with cover at a widely opened position and a maximized cover plate assembly opening is formed and wherein said maximized cover plate assembly is configured to accommodate heavy duty gauge cords.

In yet even another implementation of the invention disclosed herein an electrical outlet cover assembly can include a base, a cover for mating with the base, and a hinge. The hinge can be on one of the four sides of the cover corresponding respectively to the four sides of the base, and wherein the cover is hinged to the base so that the cover can swing forward and backward against the base by way of the hinge.

Yet even more embodiments will be apparent to one skilled in the art of the invention and this summary of the invention is meant to merely provide the reader with examples of the invention claimed in the claims and described in more detail in the Figures, below.

Provided herein is an electrical assembly that can include a base configured for accepting at least one electrical device, the base having a rear wall, a top wall, a bottom wall, a pair of side walls and an opening located in the rear wall and an adapter plate comprising a front face and a rear face; the adapter plate is configured to (i) fit in the opening of the base and (ii) accept the at least one electrical device.

In one or more aspects the assembly can include a weatherproof cover, wherein the cover is secured to the base and is configured for covering the base, the adapter plate and the at least one electrical device so as to provide protection from the environment, the cover having a front wall, a top wall, a bottom wall and a pair of side walls.

In one or more aspects the assembly can include one or more adapter inserts placeable in an opening of the adapter plate, wherein the adapter inserts, upon assembly, allows the adapter plate to accommodate the at least one electrical device.

In one or more aspects the adapter inserts securely connect the adapter inserts with each other and with the adapter plate.

In one or more aspects the adapter insert comprises one or more tabs and one or more lips; each tab having a protrusion and each lip having a protrusion that mates with the tabs.

In one or more aspects the tabs are located on the outer periphery of the adapter insert and the lips are located on the inner periphery of the adapter insert.

In one or more aspects the tab on the outer periphery of an inner adapter insert interlocks with the lip on an inner periphery of an outer adapter insert, to connect the adapter inserts to each other.

In one or more aspects the tab on the outer periphery of the outer adapter insert interlocks with a lip on an inner periphery of the adapter plate, to connect the outer adapter insert with the adapter plate. In one or more aspects the shape of the adapter inserts may be selected from the group consisting of circular rings, oval rings, rectangular inserts and square inserts.

In one or more aspects the adapter plate has at least one opening for accommodating a GFCI electrical device or has at least two openings for accommodating a duplex electrical device.

In one or more aspects the adapter plate is assembled to the base by an interlock.

In one or more aspects the assembly can include (a) the base inner periphery has a pair of underhanging edges separated by a base central edge disposed thereon; (b) the adapter plate outer periphery has a pair of overhanging edges separated by an adapter plate central edge disposed thereon; and (c) the underhanging edges of the base interlock with the overhanging edges of the adapter plate.

In one or more aspects the assembly further includes (a) one or more notches in the base; (b) one or more ribs in the adapter plate; (c) an axis of rotation defined longitudinally along the one or more ribs; and wherein the one or more ribs are configured to fit into the one or more notches and are secured as the adapter plate is rotated about the axis of rotation.

In one or more aspects one or more notches are shaped to form a path receive the ribs along two axes. In one or more aspects the path may right angled, in others the path may be curved.

In one or more aspects to snap fit the adapter plate to the base, the ribs of the adapter plate are inserted into the notches of the base, and the adapter plate either falls down due to gravity or is pressed to the base by swiveling the adapter plate into the path so as to secure the adapter plate and the base to each other.

In one or more aspects the base further comprises slots located on the base side walls and the base walls of the base to insert a drain plate and the drain plate prevents water or moisture entering the enclosure from the base side walls. In one or more aspects the drain plate is plastic.

In one or more aspects the drain plate is removable and is interchangeable between the slots located on the base side walls and the base walls of the base.

In one or more aspects the drain plate is removed from the slot on the base wall of the base and is placed in the slot on the base side wall when the cover is changed from a vertical mounting position to a horizontal mounting position or when the cover is changed from a horizontal mounting position to a vertical mounting position.

In one or more aspects the rubber flaps are secured along the periphery of the base or the cover to protect the assembly from environmental contamination.

In one or more aspects one or more drain holes are located on the base wall of the base or the cover to drain water, when the drain plate fails to prevent water or moisture from entering the enclosure.

In one or more aspects the a first pair of laterally aligned hinge members projecting up from the cover top wall and a second pair of laterally aligned hinge members projecting up the cover side wall, each hinge member further comprising a raised member with a bolt-receiving opening; a first pair of laterally aligned hinge members projecting up from the base top wall and a second pair of laterally aligned hinge members projecting up from the base side wall, each hinge member having a raised member and a bolt-receiving opening located in the raised member; a removable bolt to hingeably connect the cover to the base; the bolt can be slid through the bolt-receiving openings located in the raised members on the cover top wall and the base top wall or through the bolt-receiving openings located in the raised members on the cover side wall and the base side wall to secure the cover and the base in a vertical orientation or horizontal orientation respectively; wherein the bolt is removed from the bolt-receiving openings located in the raised members of the cover top wall and is placed in the bolt-receiving openings located in the raised members of the cover side wall, when the cover is changed from a vertical mounting position to a horizontal mounting position, and the bolt is moved from the bolt-receiving openings located in the raised members of the cover side wall and is placed in the bolt-receiving openings located in the raised members of the cover front wall, when the cover is changed from a horizontal mounting position to a vertical mounting position.

In one or more aspects the raised members of the hinge members are located on either side of the center of the top wall and the side walls of the cover and the base.

In one or more aspects the bolt-receiving openings located on the cover have threads located in the raised member and the bolt have threads.

In one or more aspects a latch tab located on the base bottom wall engages with a latch plate on the cover so as to secure the cover to the base together.

In one or more aspects a latch tab located on the base bottom wall of the base has a hook structure.

In one or more aspects one or more key holes are located on the rear wall of the base to mount the base on the electrical device.

In one or more aspects the adapter plate and/or the adapter insert has a spring tongue interlocking mechanism configured to provide a clamping force on an object configured to mate with the adapter insert.

In one or more aspects the adapter plate and/or adapter insert comprises a cantilevered member integral with the adapter plate configured to provide a clamping force on an object configured to mate with the adapter plate.

In one or more aspects the adapter insert includes a contoured surface configured to mate with the cantilevered member integral with the adapter plate.

In one or more aspects the base is provided with a side-wall opening, wherein the base includes a plurality of flexible members directly abutting each other and the plurality of flexible members fill the entire space formed by said opening.

Provided herein is a method of installing an outdoor electrical assembly having A) snap fitting an adapter plate into an opening of a base by 1) inserting one or more ribs of the adapter plate into one or more notches of the base; and 2) swiveling the adapter plate into the base and securing the adapter plate into place; and B) inserting one or more adapter inserts into an opening of the adapter plate by 1) interlocking one or more tabs on the outer periphery of an inner adapter insert with one or more lips on an inner periphery of an outer adapter insert, thereby connecting the adapter inserts to each other; and 2) interlocking one or more tabs on the outer periphery of the outer adapter with one or more lips on an inner periphery of the adapter plate, thereby connecting the adapter inserts to each other; and C) connecting the base and a cover in either a vertical mounting position or a horizontal mounting using a removable bolt; wherein changing the cover from a vertical mounting position to a horizontal mounting position includes 1) removing the bolt from a pair of laterally aligned hinge members located on the cover top wall and a pair of laterally aligned hinge members located on the base top wall; 2) aligning a pair of laterally aligned hinge members located on the cover side wall with a pair of laterally aligned hinge members located on the base side wall; and 3) sliding the bolt through bolt-receiving opening located on the cover side wall and the base side wall, thus connecting the base to the cover in a horizontal mounting position.

In one or more aspects the assembly comprises a pair of upward sloping edges located on either side of base central edge; and a pair of downward sloping edges located on either side of adapter plate central edge.

In one or more aspects the pair of upward sloping edges of the base engage with the pair of downward sloping edges of the adapter plate so as to secure the adapter plate in place with the base.

In one or more aspects the assembly comprises an inner water dam and an outer water dam located on the periphery of the base to collect water so as to prevent water from entering the electrical device.

Other objects, aspects, and advantages of the present invention will become apparent from the following description, the accompanying drawings, and the appended claims.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The following discussion of the drawings are meant to describe certain embodiments, not all embodiments, such as would be discernable to one of ordinary skill in the art.

Figure 1A:
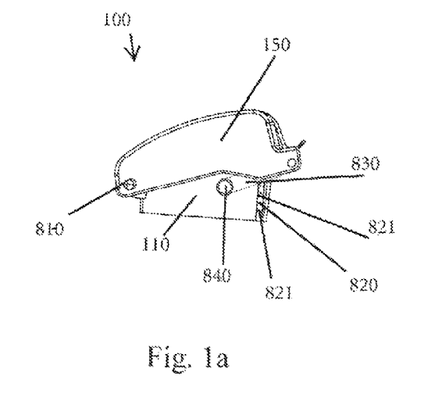
FIGS. 1A-1E depict an electrical outlet cover assembly.
Figure 1B:
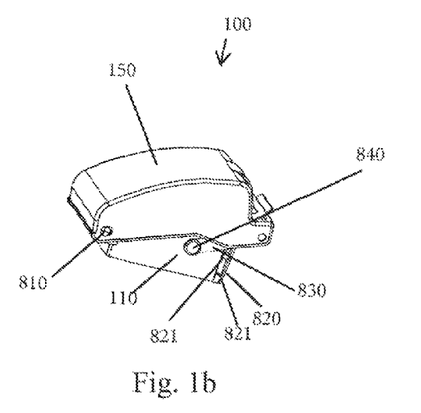
Figure 1C:
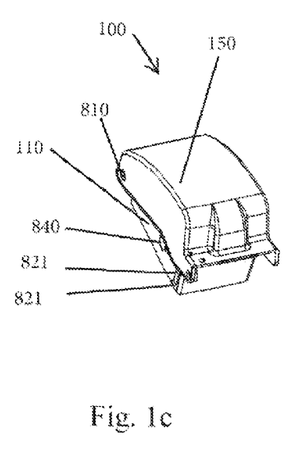
Figure 1D:
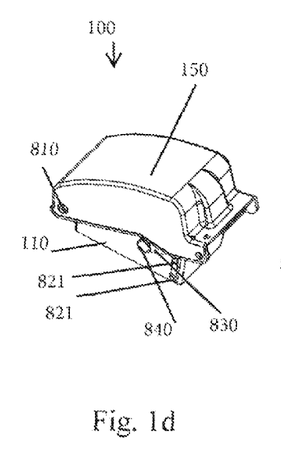
Figure 1E:
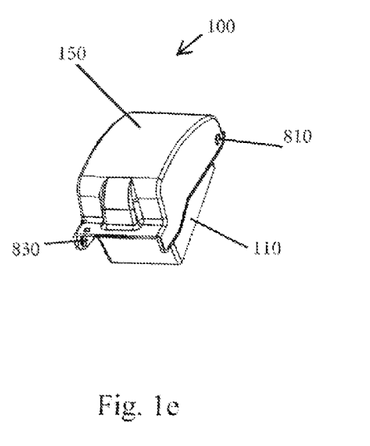

Turning now to FIGS. 1a-1e, we have various representations and orientations of an electrical outlet cover assembly 100. As can be seen in FIG. 1a, one embodiment of the invention consists of an outlet cover assembly 100 with a base 110, cover 150 and a hinge 810 capable of connecting the base 110 to the cover 150 so as to provide rotational freedom between the two for opening and closing the cover 150.

After regarding all FIGS. 1a-1e, it becomes apparent that the base 110 consists of 4 sides as well as a planar member 210 to serve as a bottom to the base 110. Planar member 210 will be shown in subsequent figures.

Further provided is a swingable lever 830. Lever 830 is connected to one side of the base 110 with a snap mechanism 840 (alternately referred to herein as simply the 'snap' 840). Snap 840 is configured so that the lever 830 can rotate about an orthogonal axis to the lever, around the snap 840. More detail will be provided below as to the snap mechanism 840.

A serrated bar 820 is also depicted. Serrated bar 820 could contain any number of serrations 821. For example, serrated bar 820 can have two or more serrations 821. In this embodiment, serrations 821 provide for the positioning of the lever 830 at different points on the serrated bar 820. In such a configuration it can be seen from the drawings that the height of cover 150 compared to base 110 adjusts depending upon which serration 821 along the serrated bar 820. As a result of multiple serrations 210, the cover 150 can adjust to multiple heights. For example, a cover 150 at a higher serration 210 can leave an open space between the cover 150 and the side of the base 110 opposite the hinge 810. This open space could accommodate an electrical cable, for example. Further, an even higher serration 210 could create an even larger open space for an even larger electrical cable.

Figure 2A:
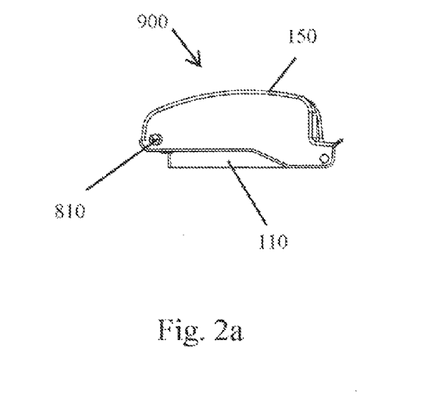
FIGS. 2A-2E depict an electric outlet cover assembly in a closed state.
Figure 2B:
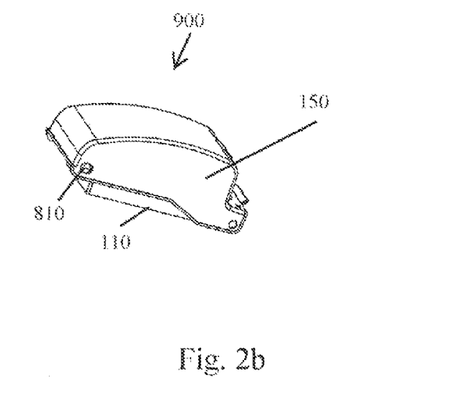
Figures 2C, 2D:
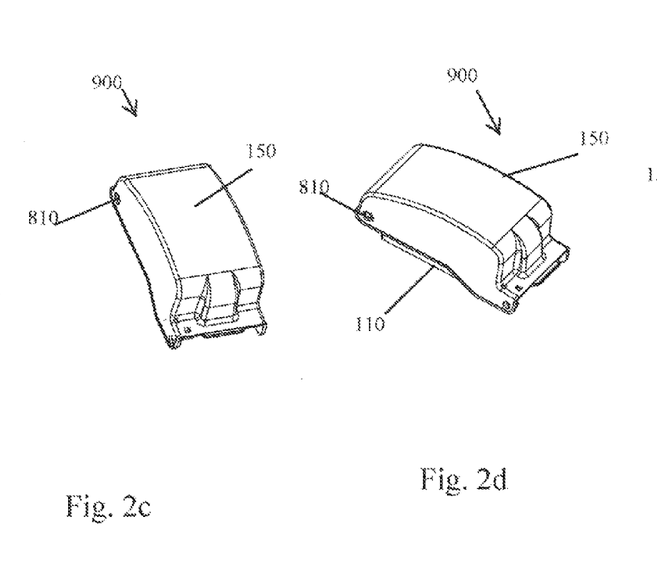
Figure 2E:
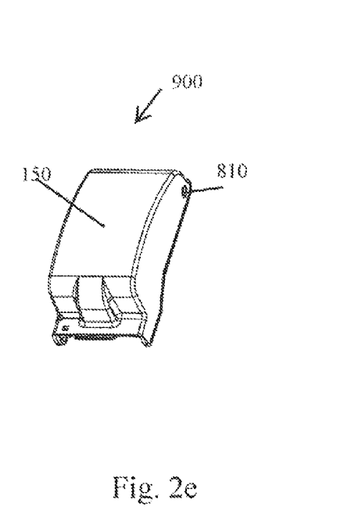

Finally, an embodiment exists where the lever 830 is placed along the lowest serration 821 on the serrated bar 820 that enables the cover 150 to close completely over the base 110. This brings us to FIGS. 2a-2.

FIGS. 2a-2e represent an electrical outlet cover assembly 100 that is closed. Closed electrical outlet cover assembly 900 can be seen from different orientations, 2a-2e and also includes cover 150, base 110 and hinge 810. In this particular embodiment, the cover 150 is designed to cover the lever 830 and serrated bar 820 from view.

Similarly, FIGS. 3a-3e depict an electrical outlet cover assembly 100 that is wide open. This open electrical outlet cover assembly 910 is seen from different orientations throughout FIGS. 3a-3e and, due to being open, provides additional information about an example planar member 210 (the bottom of the base 110).

First worth noting is that in this embodiment 910, we have depicted familiar elements including base 110, hinge 810, cover 150, snap 840, hinge 830, serrated bar 820, and serrations 821.

Figure 3A:
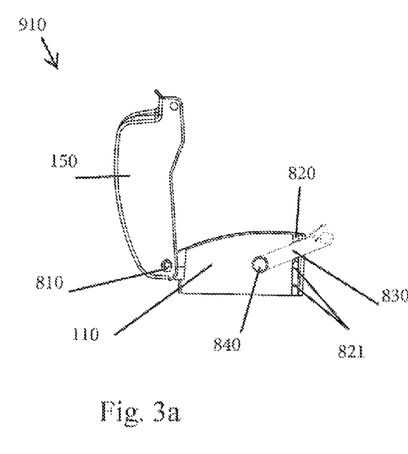
FIGS. 3A-3E depict an electrical outlet cover assembly in an open state.
Figure 3B:
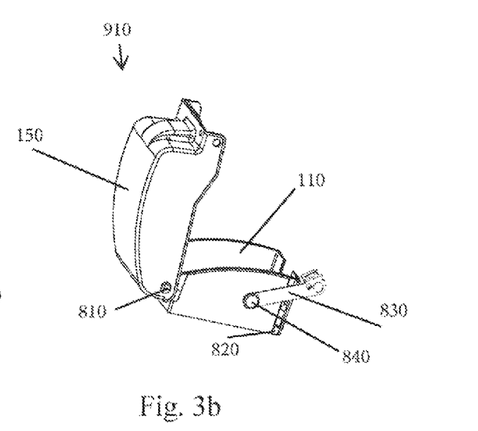
Figure 3C:
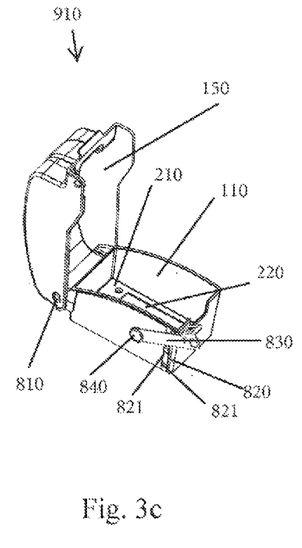
Figure 3D:
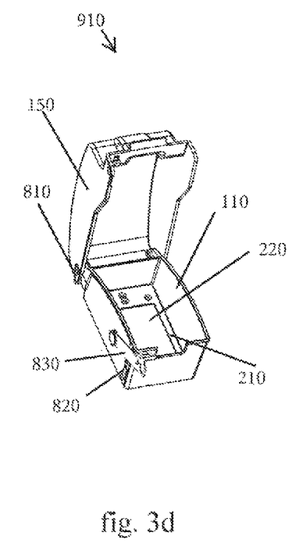
Figure 3E:
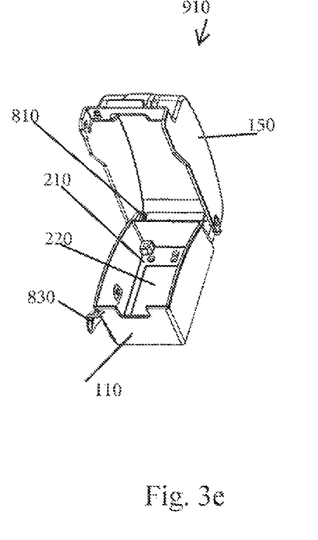

However, FIGS. 3c-3e contain examples of the bottom of the base 100, herein called the planar member 210. In certain embodiments the planar member 210 contains a mounting aperture 220. Mounting aperture 220 can be any size or shape, and not just the rectangular shaped aperture seen here. By way of non-limiting examples, mounting aperture 220 can be circular, rectangular, octagonal, smaller, larger and even multi-apertured.

In some embodiments, planar member 210 and mounting aperture 220 are configured to accept at least one detachable adapter 600 to it, as will be illustrated below, in FIG. 5.

Figure 4A:
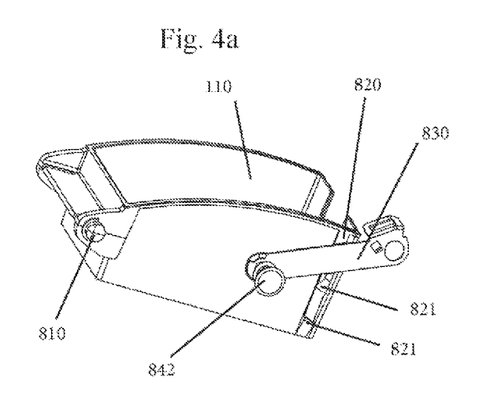
FIGS. 4A-4C depict the base of an electrical outlet cover assembly.
Figure 4B:
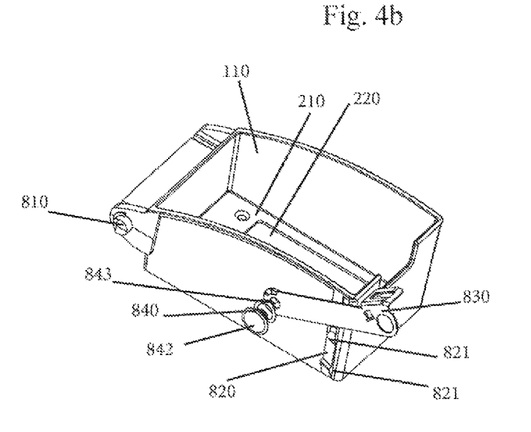
Figure 4C:
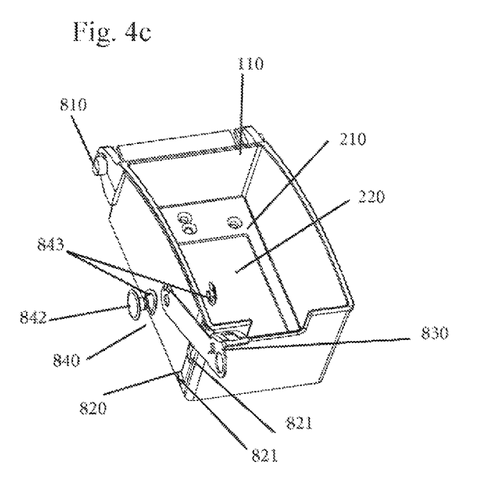

Seen in FIGS. 4a-4c are embodiments of the invention with detailed snap mechanisms 840. Again, familiar elements can be seen such as base 110, hinge 810, serrated bar 820, serrations 821 and hinge 830. As always herein, similar elements in different embodiments does not limit the drawings in any way. Nor does it limit the discussion of the drawings, herein. Examples are always, just that: examples of preferred embodiments.

Also seen is an example of a snap mechanism 840. For example, snap mechanism 840 can comprise one or more female snap members 843 and one or more male snap members 842. Preferably, male snap members 842 and female spam members 843 are configured to mate to form a snap mechanism 840 for providing rotational motion to an attached lever 830. However, any snap mechanism 840 capable of providing rotational motion to a lever 830 and attach the lever 830 to one side of the base 110 will suffice.

Likewise, the snap mechanism 840 is attached to a particular side of the base 110 non-opposite to the hinge 810. Again, snap mechanism 840 can be attached to any side of the base 110. There may be embodiment where the snap mechanism 840 is placed elsewhere so long as it provides rotational motion to a lever 830 for allowing the cover 150 to open at several heights and allowing cables and such to enter the base 110.

Also seen in FIGS. 4b and 4c are planar members 210 and mounting apertures 220, the mounting apertures 220 configurable to accept one or more detachable adapters 600, 610, or 620, the discussion of which will begin now.

Figure 5A:
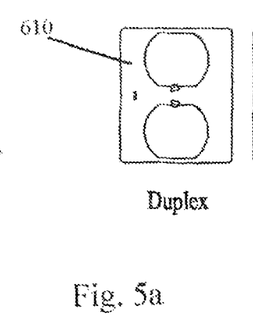
FIGS. 5A-5K depict a variety of possible adapter plates and adapters.
Figure 5B:
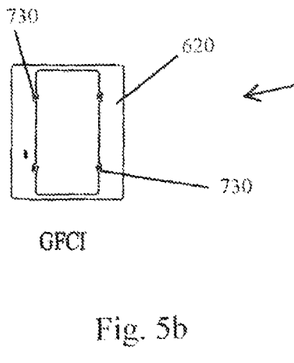

FIGS. 5a-5k depict embodiments of detachable adapter plates 500. FIG. 5a is an example of a detachable adapter plate (alternately referred to herein as simply 'adapter plate') configured to receive an electrical duplex socket 610. Meanwhile FIG. 5b is an adapter plate configured to receive a ground-fault circuit interrupt (GFCI) socket 620.

Figures 5C, 5D:
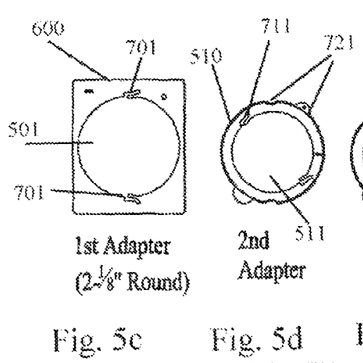

FIG. 5c is an adapter plate configured to receive an electrical round socket 600. Adapter plate 600 will serve to illustrate FIGS. 5c-5k as well. Pointing out, however, that the use of adapter plate 600 is for illustrative purposes only and adapter plates 610, 620 or any myriad of adapter plates configured to receive other sockets could have been used instead; all of which can by readily understood by one skilled in the art.

FIG. 5c also depicts a connection mechanism of tongue-like clips 730 in a "top and bottom" orientation. The tongue-like clips allow an adapter to connect firmly to another adapter. In particular, inwardly protruding tabs 701 can be seen. In only one example of how the detachable adapter 600 of 5c accepts a smaller, second adapter 510 inside of it, inwardly protruding tabs 701 mate with outward indentations 721 of FIG. 5d to secure a second adapter 510 to the first, detachable adapter 600.

Figure 5E:
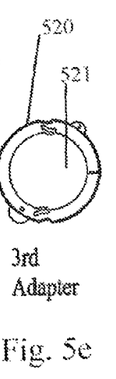
Figure 5F:
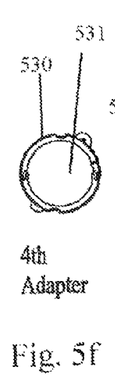

The benefit of such a modular design is to allow flexibility over the size of the first aperture 501. In other words, in this embodiment second adapter 510 fits inside the first aperture 510 of the first, detachable adapter plate 600. Thus, the total aperture size is changed, or customized, by the marriage between the first adapter plate 600 and the second adapter 510. This process can be repeated ad infinitum, using a third adapter 520 that fits into the second adapter 510 to create a second aperture 512. A fourth adapter 530 can then be inserted inside the third adapter to form a smaller, third aperture 531, and so on and so forth, as illustrated by FIGS. 5e and 5f, respectively.

FIG. 5d also depicts a tabular connection mechanism of tongue-like tabs 730 for connecting adapter plates to other adapter plates. Please note that second adapter 510 depicts protruding tongue like tabs in a non-top/bottom orientation 711. However, protruding tabs can be found in any orientation including the top/bottom orientation 701 depicted in FIGS. 5c, 5e, 5i, 5j and 5k.

Figure 5G:
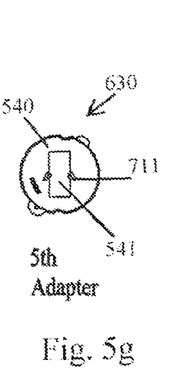

FIG. 5g is a detachable adapter plate 500, 540 with a fourth aperture 541 shaped to receive an electrical toggle switch. Importantly, the fourth aperture 541 need not be the fourth aperture in succession, but is merely the fourth by way of our non-limiting example.

Regarding the tongue-like tabs (also referred to as 'clips') 701, 711 and indentations 721, both of which comprise an example of a tabular connection mechanism of tongue like tabs 730: In a preferred embodiment tongue like tabs 701, 711 are configured to fit snugly with indentations 721 and indentations 721 are preferably configured to fit snugly with tongue-like tabs 701, 711 so as to securely mate one adapter to another in a way that prevents movement between the two. By way of non-limiting example, this connection can be an actual connection, a friction based, connection or a simple snap in place design.

FIGS. 5h-5k provide some examples of how the preceding embodiments could possible work together.

Figure 5H:
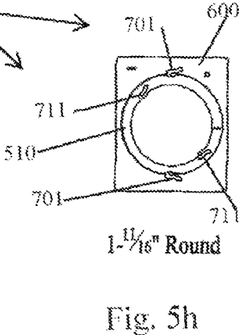

In FIG. 5h, we have second adapter 510 placed inside the first aperture 501 of detachable adapter plate 600. In this illustration, indentations 721 of the second adapter 510 are mating with tongue-like tabs 701 of the detachable adapter plate 600. The non-top/bottom orientated tongue-like tabs 711 of the second adapter can easily be seen.

Figure 5I:
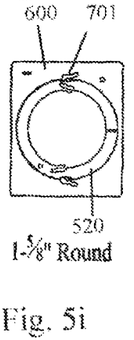

FIG. 5i depicts the third adapter 520 placed inside the first aperture 501 of detachable adapter plate 600. In this illustration, indentations 721 of the third adapter 520 are mating with tongue-like tabs 701 of the detachable adapter plate 600. At this point, the modular nature of the invention should be quite clear.

Figure 5J:
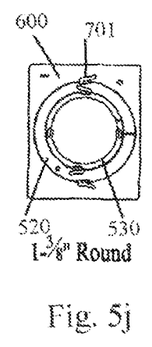

To further illustrate the nature of the invention, we have the example depicted in FIG. 5j. FIG. 5j depicts third adapter 520 placed inside the first aperture 501 of detachable adapter plate 600. In this illustration, indentations 721 of the third adapter 520 are mating with tongue-like tabs 701 of the detachable adapter plate 600. In addition, we can see the fourth adapter 530 snuggly inside the second aperture 521 of the third adapter 520. The resultant aperture is much smaller than the original on detachable adapter plate 600.

In this example tongue-like tabs 701 and indentations 721 are again used to mate the adapters together, however many other methods can be used to secure the adapters together.

Figure 5K:
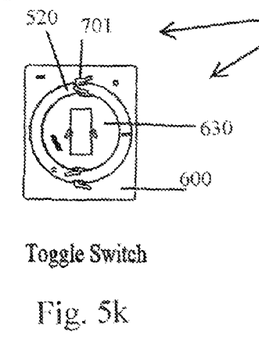

Finally, we have FIG. 5k. FIG. 5k illustrates how a detachable adapter plate 600, which is configured to receive an electrically round socket, can be configured to receive a much smaller, rectangular adapter plate 630 which is configured to receive an electrical toggle switch. Here we have fifth adapter 540 placed inside the second aperture 521 of third adapter 520 using the familiar example mechanism of tongue-like tabs 701 and indentations 721. And using the same mechanism, third adapter 520 can be placed inside first aperture 501 of detachable adapter plate 600.

While various embodiments of the invention have been described, it will be apparent to those of ordinary skill in the art that many more embodiments and implementations are possible within the scope of the invention. The various embodiments described herein include a variety of electrical elements and combinations of electrical elements, such as inductors, capacitors, voltage sources, switches, resistors, diodes, and power converters electrically coupled in various manners. The described example configurations of electrical elements and devices are examples that may be embodied through equivalent configurations having additional or fewer of the described elements, circuits, and devices, and alternative elements, alternative circuits, and/or alternative devices within the scope of invention. Accordingly, the invention is not to be restricted except in light of the attached claims and their equivalents.

I claim:

1. An electrical outlet cover assembly comprising:
    a base, the base further comprising four sides and a planar member for a bottom,
        wherein the planar member further comprises a mounting aperture in a center of said planar member, and
    at least one detachable adapter plate,
        wherein said at least one detachable adapter plate has a substantially circular first aperture inside it and is able to fit inside the mounting aperture, and wherein said at least one detachable adapter plate contains a first two tongue-like tabs around the circumference of said first aperture that are spread inward and able to interlock with an indentation on the outside circumference of a second adapter plate.

2. An electrical outlet cover assembly according to claim 1, wherein:
    said second adapter plate comprises a cut-out for receiving a toggle switch, a ground-fault circuit interrupt (GFCI) socket or electrical outlet.

3. An electrical outlet cover assembly according to claim 1, wherein the second adapter plate contains a second aperture and wherein said second adapter plate contains a second two tongue-like tabs around the circumference of said second aperture that are spread inward and able to interlock with an indentation on the outside circumference of a third adapter plate.

4. An electrical outlet cover according to claim 3, wherein:
    said third adapter plate comprises a cut-out for receiving a toggle switch, a ground-fault circuit interrupt (GFCI) socket or electrical outlet.

5. An electrical outlet cover assembly according to claim 1, wherein the second adapter plate is a knock-out and can be separated from said at least one detachable adapter plate by applying pressure onto said second adapter plate.

* * * * *